(12) United States Patent
Leoutsarakos

(10) Patent No.: US 9,213,853 B2
(45) Date of Patent: *Dec. 15, 2015

(54) PASSWORD-LESS LOGIN

(71) Applicant: Nicolas Leoutsarakos, Montreal (CA)

(72) Inventor: Nicolas Leoutsarakos, Montreal (CA)

( * ) Notice: Subject to any disclaimer, the term of this patent is extended or adjusted under 35 U.S.C. 154(b) by 405 days.

This patent is subject to a terminal disclaimer.

(21) Appl. No.: 13/791,996

(22) Filed: Mar. 9, 2013

(65) Prior Publication Data

US 2013/0185815 A1   Jul. 18, 2013

Related U.S. Application Data

(63) Continuation-in-part of application No. 13/607,769, filed on Sep. 9, 2012, now Pat. No. 8,954,758.

(60) Provisional application No. 61/578,224, filed on Dec. 20, 2011.

(51) Int. Cl.
   *G06F 21/31* (2013.01)
   *G06F 21/62* (2013.01)
   *G06F 21/36* (2013.01)

(52) U.S. Cl.
   CPC .............. *G06F 21/62* (2013.01); *G06F 21/36* (2013.01)

(58) Field of Classification Search
   USPC ........................................................ 713/193
   See application file for complete search history.

(56) References Cited

U.S. PATENT DOCUMENTS

| | | | |
|---|---|---|---|
| 4,885,778 A | 12/1989 | Weiss | |
| 5,657,470 A | 8/1997 | Fisherman et al. | |
| 6,915,435 B1 | 7/2005 | Merriam | |
| 7,302,571 B2 | 11/2007 | Noble et al. | |
| 7,337,331 B2 | 2/2008 | Yoshida | |
| 7,404,085 B2 | 7/2008 | Lacasse et al. | |
| 7,565,297 B2 | 7/2009 | Labaton | |
| 7,761,704 B2 | 7/2010 | Ho et al. | |
| 7,783,900 B2 | 8/2010 | Hacigumus et al. | |
| 7,826,619 B2 | 11/2010 | Hanaoka | |
| 7,836,515 B1 | 11/2010 | Woodward | |
| 7,849,314 B2 | 12/2010 | Kao et al. | |
| 7,895,437 B2 | 2/2011 | Ganesan et al. | |
| 7,907,838 B2 | 3/2011 | Nasiri et al. | |

(Continued)

FOREIGN PATENT DOCUMENTS

| | | |
|---|---|---|
| JP | 2006-033780 | 2/2006 |
| WO | WO 2010/133353 | 11/2010 |

OTHER PUBLICATIONS

EMC2 Webpage, RSA SecureID, www.emc.com/security/index.htm, printed Sep. 2012.

(Continued)

*Primary Examiner* — Tu Nguyen
(74) *Attorney, Agent, or Firm* — Law Office of Dorian Cartwright; Dorian Cartwright

(57) ABSTRACT

User profiles stored on a server control access to private data. Access control to the user profiles themselves is provided without a password. In more detail, the user profile is functionally handicapped by at least a portion of digital data (or a cryptographic key) associated with the user profile being removed and discarded after being sent to an enabling device. A human gesture from the user first provides a key to reconstitute the key or restore the missing data portion in the enabling device which is then transmitted to the server to reconstitute the key or restore the missing data portion in order to reconstitute the user profile for access.

18 Claims, 11 Drawing Sheets

(56) References Cited

U.S. PATENT DOCUMENTS

| | | | |
|---|---|---|---|
| 7,921,450 | B1 | 4/2011 | Vainstein et al. |
| 2003/0061503 | A1 | 3/2003 | Katz |
| 2004/0030917 | A1 | 2/2004 | Karamchedu et al. |
| 2004/0049700 | A1* | 3/2004 | Yoshida ........................ 713/201 |
| 2008/0015995 | A1 | 1/2008 | Chen |
| 2008/0059787 | A1 | 3/2008 | Hohenberger et al. |
| 2008/0065894 | A1 | 3/2008 | Wang et al. |
| 2008/0301775 | A1 | 12/2008 | Ollikainen et al. |
| 2009/0196417 | A1 | 8/2009 | Beaver et al. |
| 2009/0327745 | A1 | 12/2009 | Dang et al. |
| 2010/0050244 | A1 | 2/2010 | Tarkhanyan et al. |
| 2010/0107219 | A1 | 4/2010 | Thompson et al. |
| 2011/0099379 | A1 | 4/2011 | Ganesan et al. |
| 2011/0112968 | A1 | 5/2011 | Florek |
| 2011/0246766 | A1 | 10/2011 | Orsini et al. |
| 2012/0274550 | A1 | 11/2012 | Campbell et al. |
| 2013/0159732 | A1 | 6/2013 | Leotsarakos |

OTHER PUBLICATIONS

VASCO Data Security Webpage, www.vasco.com/startpage.aspx, printed Sep. 2012.

AES Website Homepage, FIPS, http://csrc.nist.gov/archive/aes/index1.html, printed Sep. 2012.

Rivest, R.L. et al., "A method for obtaining Digital Signatures and Public Key Cryptosystems." Communications of the ACM. Feb. 1978 21(2) pp. 120-126.

Blakley, G.R., Safeguarding Cryptographic Keys, 1979, Proceedings of the National Computer Conference 48: 313-317.

Shamir, Adi, "How to Share a Secret", Programming Techiniques, Communications of the ACM, vol. 22 (11), 612-613, Nov. 1979, doi: 10.1145/359168.359176.

Noar, Moni et al., Visual Cryptography, 14 pages, in Eurocrypt, 1994 Proceedings.

Herzberg, Amir, Introduction to Cryptography Subject 6: Resiliency to Corruptions and key Exposures, Jan. 11, 2004, Computer Science Department, Bar Ilan University, 69 pages.

Bellare et al., Protecting against Key Exposure: Strongly Key-Insulated Encryption with Optimal Threshold, Department of Computer Science & Engineering, University of California San Diego, Jun. 26, 2002, San Diego, US.

Golle et al., Universal Re-encryption for Mixnets, Topics in Cryptology—CT-RSA 2004, Lecture Notes in Computer Science, 2004, vol. 2964/2004, 1988, Abstract.

* cited by examiner

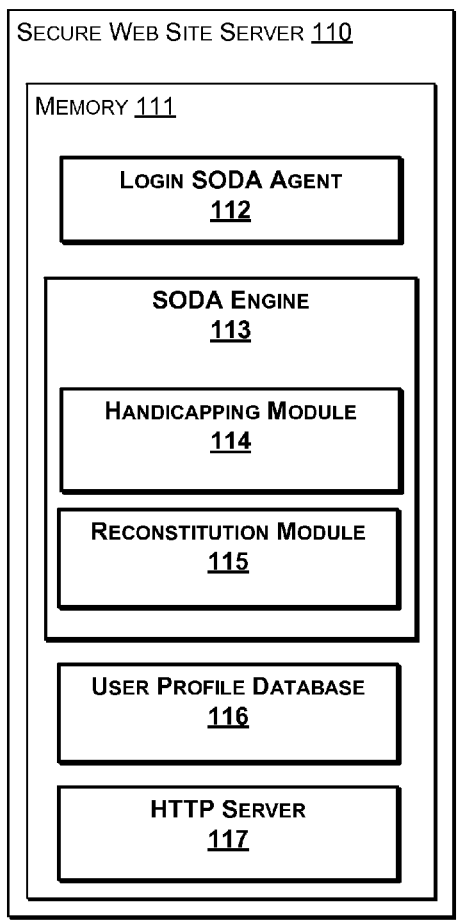
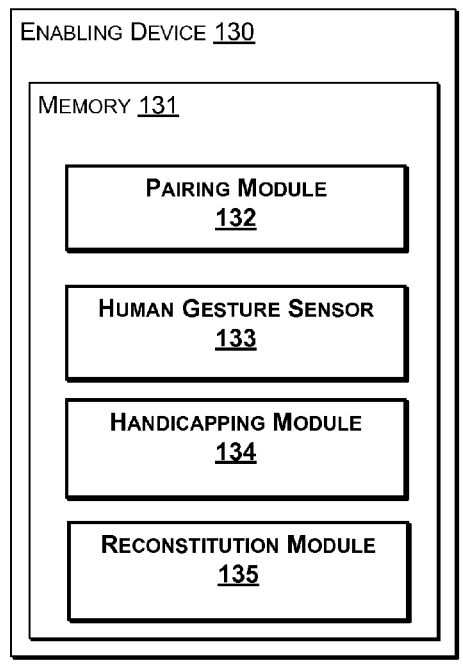
FIG. 1B
FIG. 1C

PASSWORD-LESS LOGIN

CROSS-REFERENCES TO RELATED APPLICATIONS

This application claims priority under 35 USC 120 to U.S. patent application Ser. No. 13/607,769, entitled PASSWORD-LESS SECURITY AND PROTECTION OF ONLINE DIGITAL ASSETS, by Nicolas Leoutsarakos, which in turn claims priority under 35 USC 119(e) to U.S. patent application Ser. No. 61/578,224, by Nicolas Leoutsarakos, entitled SYSTEM AND METHODS FOR PASSWORD-LESS USER AUTHENTICATION, ACCESS CONTROL AND TRANSACTION TRACKING, and filed on Dec. 20, 2011, the contents of which are being hereby incorporated by reference.

FIELD OF THE INVENTION

The invention relates generally to online security and more specifically, access control (e.g., login) to user profiles without a password.

BACKGROUND OF THE INVENTION

Currently, access to sensitive data on Internet web sites is protected by passwords. Prior to allowing access, users present login credentials such as a username and a password to web sites. The login credentials are typed into a user-facing device which is accessing a web site over the Internet for comparison to known credentials (i.e., username and password) stored locally at a web site.

Problematically, the comparison paradigm is vulnerable to phishing or key-logging attacks by imposters, hacking or network sniffing, and even guessing by trial and error. Once exposed, the user files and applications are open not only to undetected theft by copying, but to vandalism by deletion. Moreover, the entire account is exposed at once because individually protecting each file and application with a unique password is not practical. Conventional encryption techniques to protect user files and applications are similarly vulnerable, especially when a cryptography key is stored at an end point.

Furthermore, users are currently burdened with memorizing and protecting more and more passwords. Some users have a single, default password which is not recommended because all accounts are vulnerable to a single password interception. Also, various systems have varying strength requirements for passwords. As a result, users are requested to provide hard to memorize passwords that include numbers, capital letters, or non-traditional characters, adding to user confusion.

What is needed is a robust technique to control access to user profiles without passwords, while overcoming the deficiencies of the prior art.

SUMMARY

To meet the above-described needs, methods, computer program products, and systems for providing access control to user profiles without a password.

In one embodiment, a user scans a QR (Quick Response)-code displayed by a web site with a mobile device, and then enters a gesture to the mobile device for logging to the web site, based only on the scan and gesture. More specifically, one embodiment comprises a user profile stored on a server by a user is functionally handicapped (or disabled). By removing at least a portion of digital data (either a conceptual key, or a cryptographic key) associated with the user profile and discarding the key after being distributed to an enabling device, a user profile is rendered substantially useless. Additionally, in another embodiment, the key is handicapped by the enabling device with, for example, a conceptual key or a cryptographic key which is formed from at least a human gesture and subsequently discarded. Consequentially, no complete key is stored on any physical device, thereby reducing the opportunity for compromise.

In an embodiment, when access to the user profile for login purposes is requested, machine readable code is displayed on, for example, a login web page. An enabling device previously paired with the user profile starts the user profile enabling process. The machine readable code is scanned by the enabling device to identify the web site and a human gesture is provided to reconstitute the digital data portion (or key) stored on the enabling device. Next, the key is transmitted to the web site server for reconstituting another digital data portion (or key) used to enable the user profile. In an embodiment, a log that is admissible in court records accesses.

In another embodiment when access to the user profile for login purposes is requested, a user enters a username in a login web page. An enabling device associated with the same username is accessed and a human gesture is provided to reconstitute the digital data portion (or key) stored on the enabling device. Next, the digital data portion is transmitted to the server for reconstituting another digital data portion (or key) used to enable the user profile.

In some embodiments, more than one key is distributed among hosting and enabling devices in accordance with a secret splitting algorithm (e.g., Shamir algorithm). For instance, vertical co-ownership implements a hierarchical process for approval of an access request. In operation, a request can be granted by a floor salesman device and confirmed by a sales manager device, both of which have a unique key. In another instance, horizontal co-ownership implements a distributed process for approval of an access request by sending keys to multiple owners. Two types of horizontal co-ownership are equal co-ownership (i.e., any co-owner can access independently) and dependent co-ownership (i.e., more than one co-owner necessary to access).

Advantageously, user profiles are secured and protected from hacking, known attacks and other vulnerabilities, and are kept private and confidential, without a password. Thus, owners of user profiles control access to private data on web sites.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 1B is a more detailed block diagram illustrating a secure web site server of FIG. 1A, according to one embodiment.

FIG. 1C is a more detailed block diagram illustrating an enabling device of FIG. 1A, according to one embodiment.

DETAILED DESCRIPTION

The present invention provides methods, computer program products, and systems for providing access control to user profiles without a password. Generally, an asset owner controls access to a user profile by functionally disabling the user profile and distributing the key needed for enabling the user profile. In operation, a user scans a QR (Quick Response)-code displayed by a web site and then enters a gesture to login to the web site, based only on the scan and gesture.

A user profile can be associated with a web site, or any other type of computerized system. As used herein, the user profile refers to a digital asset associated with a user for accessing certain data of a secure system (e.g., personal banking information, or a streaming movie account). The user profile, in an embodiment, can be a collection of information which is sufficient for a system to uniquely identify a user (i.e., a person or a system). Functionally handicapping the user profile refers to making the user profile partially or completely unusable in traditional forms by removing parts of the data, encrypting, removing file formatting information, removing files, or source code, and the like (using, for example, a SODA engine). For example, users may want to securely access the personal banking information or the streaming movie account, without having to use a password. Distributing a key for enablement refers to splitting the key and sending parts (or derivative parts) of the key to enabling devices. In one case, users scan a QR-code from a display screen of a web site with a smart phone, and provide a gesture to the phone for authentication. In response, user profiles are temporarily enabled to allow user access. Numerous alternatives are described herein.

Figure 1A:
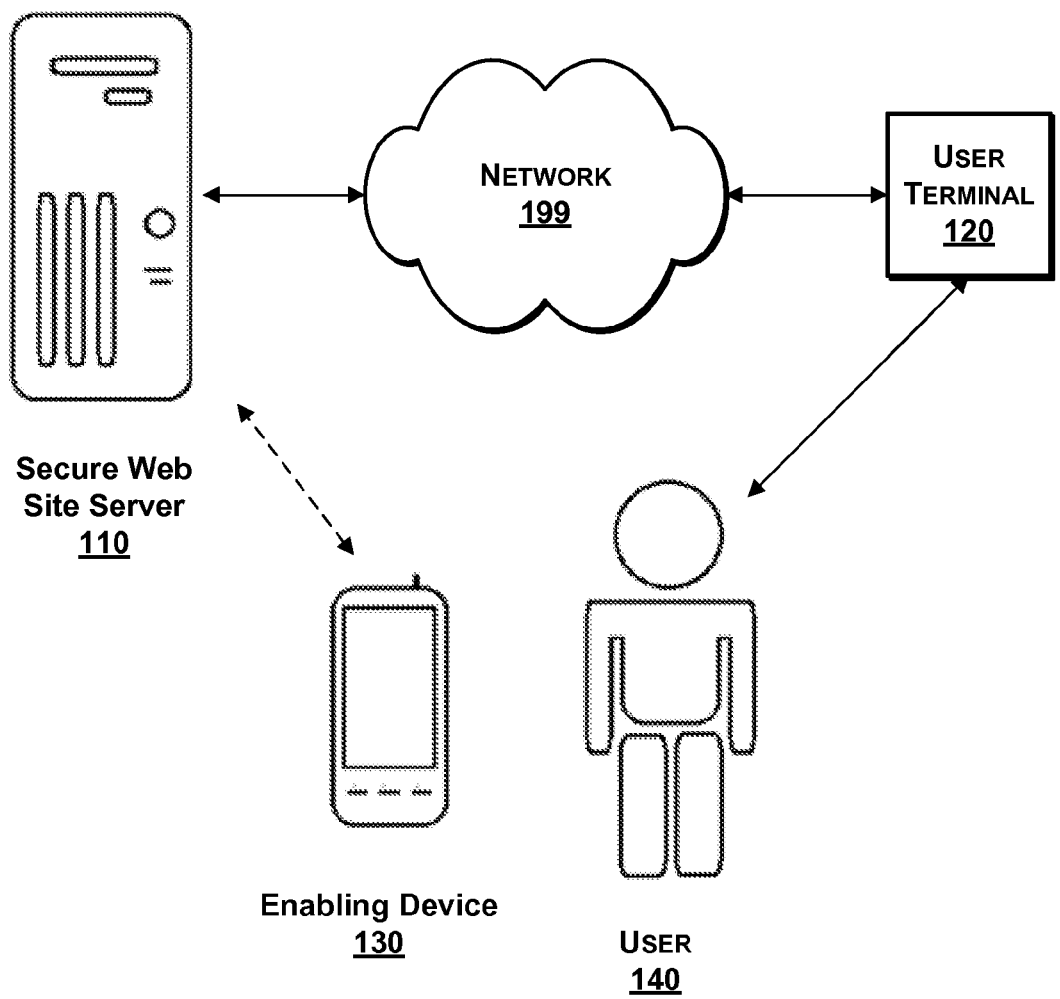
FIG. 1A is a high-level block diagram illustrating a system to provide access control to user profiles without a password, according to one embodiment.

User Profile Protection Systems (FIGS. 1A-C)

FIG. 1A is a high-level block diagram illustrating a system 100 for providing access control to user profiles without a password, according to one embodiment. The system 100 comprises a secure web site server 110, a user terminal 120, an enabling device 130 and a user 140, each in communication with a network 199. From a data flow perspective, the user 140 uses the user terminal 120 and the enabling device 130 to interact with the secure web site server 110 through the network 199.

The network 199 provides a data communication channel between the enabling device 130 used by the asset owner 130 and the secure web site server 110. The network 199 can be, for example, the Internet, a data or voice cellular network, or a short or long range local data network. The data communication channel can be through any suitable wired (e.g., Ethernet), or wireless (e.g., Wi-Fi, Bluetooth, or 3G) medium, or combination. Other embodiments of communication channels are possible, including hybrid and near field networks. In one embodiment, the user terminal 120 communicates with the secure web site server 110 using a cellular network while the user terminal 120 does so using a wired data network. Additional network components not shown in FIG. 1A can also be part of the system 100, such as firewalls, virus scanners, routers, switches, application servers, databases, and the like.

Figure 7:
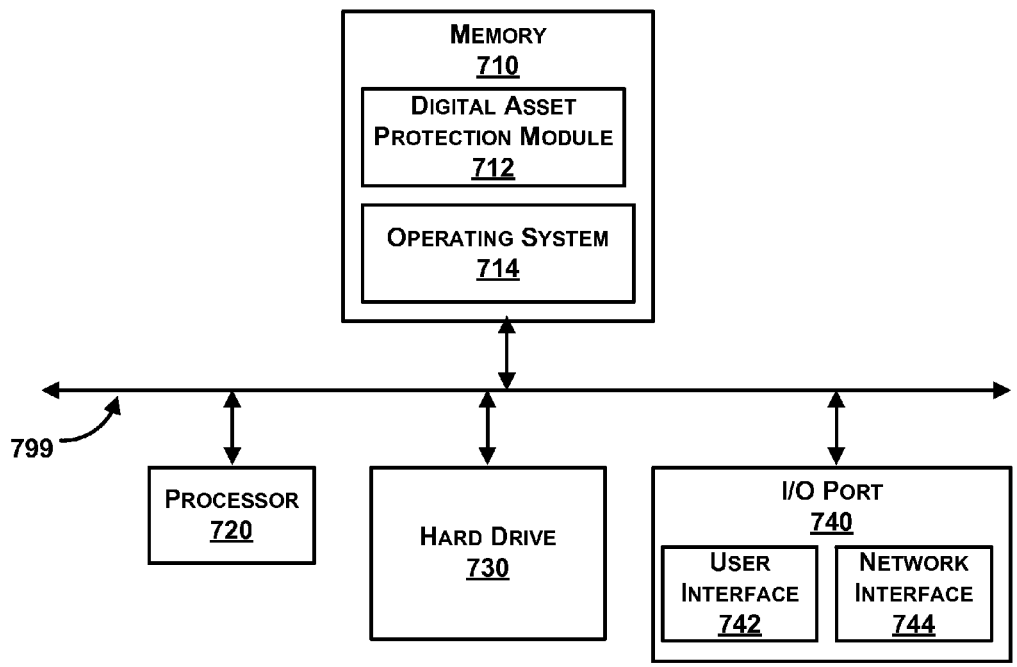
FIG. 7 is a block diagram illustrating an exemplary computing device, according to one embodiment.

The secure web site server 110 can be a computer, a set of distributed computers, a server, a virtual server, any passive device that is activated with a host processor, such as a memory device (e.g., a flash drive), or any processor-based device, as described further in FIG. 7. In one embodiment, the secure web site server 110 manages protection of user profiles and associated data, hosted locally and remotely. To do so, the secure web site server 110 functionally disables user profiles that are stored by removing a digital data portion associated with the file (either directly from the file, or indirectly related such as a cryptographic key). The removed digital data portion is sent to the enabling device 130 and discarded so that reconstitution of the user profile without the removed digital data on the secure web site server 110 is substantially impossible. Reconstitution is possible when the enabling device 130 returns the digital data portion to the secure web site server 110 for enabling (e.g., temporarily) the user profile. The secure web site server 110 can be continually connected online, or can connect to the network 199 for the purpose of authorization of access requests. The secure web site server 110 can be operated by a data storage service, a data center, a mobile telephone company providing service for the enabling device 130, a company associated with the user 140 or the government, and the like. Embodiments of the secure web site server 110 are discussed in more detail below in association with FIG. 1B.

The user terminal 120 can be any computing device disclosed herein, such as in FIG. 7, a computer terminal, a POS device, an ATM (automated teller machine), an airplane ticket kiosk, any machine requiring a login, an automobile user interface, and the like. The user 140 attempting to access a user profile through the user terminal 120 is presented with machine readable code through a display. The machine readable code can be, for example, a QR-code, a UPC (Universal Product Code) label, a barcode, a serial number, or any other suitable embedded information.

The enabling device 130 provides an interface between the user 140 and the secure web site server 110 for authentication. The enabling device 130 is preferably a mobile device that is convenient to the user 140, such as a cellular telephone, a smart cellular telephone, or a tablet computer, as described further in FIG. 7. The enabling device 130 can also be a laptop, a stationary or desktop computer, or the like. In an embodiment the enabling device 130 and the user terminal 120 are housed in the same hardware device. In operation, the enabling device 130 is paired with a user profile of the user 140. The enabling device 140, in an embodiment, can further handicap and store a digital data portion that functionally handicaps the user profile of the secure web site server 110. In order to login a user, the enabling device 130 can enable a user profile by reconstructing and providing the digital data portion to secure web site server 110. For example, a QR-code or other machine readable code is scanned from the user terminal 120 by the enabling device 130, to identify a particular web site presented on terminal 120. Additionally, an optional human gesture, a bio-sample or other type of input can be received and processed (e.g. converted to data) by the enabling device 130 in order to reconstruct a digital data portion and send it to the secure web site server 110 for user profile reinstatement. Some implementations can modify a conventional enabling device by installing a downloaded client or mobile application. Embodiments of the enabling device 130 are discussed in more detail below in association with FIG. 1C.

The user 140 (or users) can be an individual that creates, controls, or utilizes a digital asset. The user 140 can be a sole owner of a user profile, or could be a co-owner in a horizontal or vertical co-ownership scheme as described below. The user profile can vary depending on the web site, or not be associated with a digital entity other than a web site (e.g., a login to a portable movie rental machine). The user profile is created at enrollment and includes personalized data. For example, a user profile can include personal financial information, accounts numbers, file storage locators, registration for an event, social networking friends and status updates, and the like. The user profile can also include non-personal information, such as a copy of a digital book available to subscribers, access to cloud-based software, a copy of a cell phone application, and the like. In some embodiments, the user 140 provides to his enabling device 130 a bio-sample (e.g. fingerprint) that is translated to data, used to form a key to decrypt a locally stored key or data portion on the enabling device 130, which is then sent to the secure web site server 110 to reconstitute the user profile and allow the requested access.

FIG. 1B is a more detailed block diagram illustrating the secure web site server 110, according to one embodiment. The secure web site server 110 includes a memory 111 with a login SODA agent 112, a SODA engine 113, a user profile database 116 and an HTTP server 117. The components are shown in the memory 111 which, in one embodiment, can be a RAM-type memory for execution. The components can also be stored for long-term in a volatile memory, be streaming applications stored in the cloud and downloaded as needed.

The login SODA agent 112 integrates the protection and security into a web site. More specifically, the login SODA agent 112 leverages functionality of the SODA engine 113 to disable and enable user profiles, as described herein. The login SODA agent 112 in collaboration with SODA engine 113 can output machine readable information or other indications to the HTTP server 117 for display to the user 140 attempting a login. Further, the login SODA agent 112 in collaboration with SODA engine 113 can interact with the enabling device 130 to enable user profiles.

The SODA engine 113 in some embodiments is agnostic to a particular implementation (e.g., login versus POS payments or file protection). But in other embodiments, the SODA engine 113 is optimized for a particular implementation (e.g., parameters set for high security application or for minimal security application). The SODA engine 113 further comprises a handicapping module 114 to handicap user profiles and a reconstitution module 115 to enable user profiles, as discussed below. Also, embodiments of SODA technology are described in more detail in U.S. patent application Ser. No. 13/607,769, entitled PASSWORD-LESS SECURITY AND PROTECTION OF ONLINE DIGITAL ASSETS, by Nicolas Leoutsarakos which is hereby incorporated by reference.

The user profile database 116 stores user profiles for one or more users. In some embodiments, the user profile database 116 includes an Active Directory or similar platform. The user profile database 116 can be stored locally in a single memory element or over a network with a protocol-based file system (e.g., a storage area network, or SAN, a network attached storage, or NAS, or the like).

The HTTP server 117 can be an Apache server or any suitable component to deliver Web pages to a user, and perform login services to private data. The HTTP server 117 sends a login Web page for display, and once logged-in, presents private data as a Web page for display. The web pages can be composed in HTML, Java, Flash, or the like.

FIG. 1C is a more detailed bock diagram illustrating the enabling device 130, according to one embodiment. The enabling device 130 includes a memory 131 with a pairing module 132, a human gesture sensor 133, a handicapping module 134, and a reconstitution module 135. An optional secret splitting module can also be included.

The pairing module 132 sets up a user with the system 100 and enrolls the enabling device 130. The human gesture sensor 133 receives and processes gestures or other input using a touch screen, a speaker, a camera, a gyroscope, or other type of sensor. The handicapping module 134 handicaps a data portion received from the secure web site server 110 with data from a human gesture provided by the asset owner 140. The reconstitution module 135 restores the digital data portion received from the secure web site server 110 from the human gesture received for approval of access to a user profile.

User Profile Protection Methods (FIGS. 2-6B)

Figure 2:
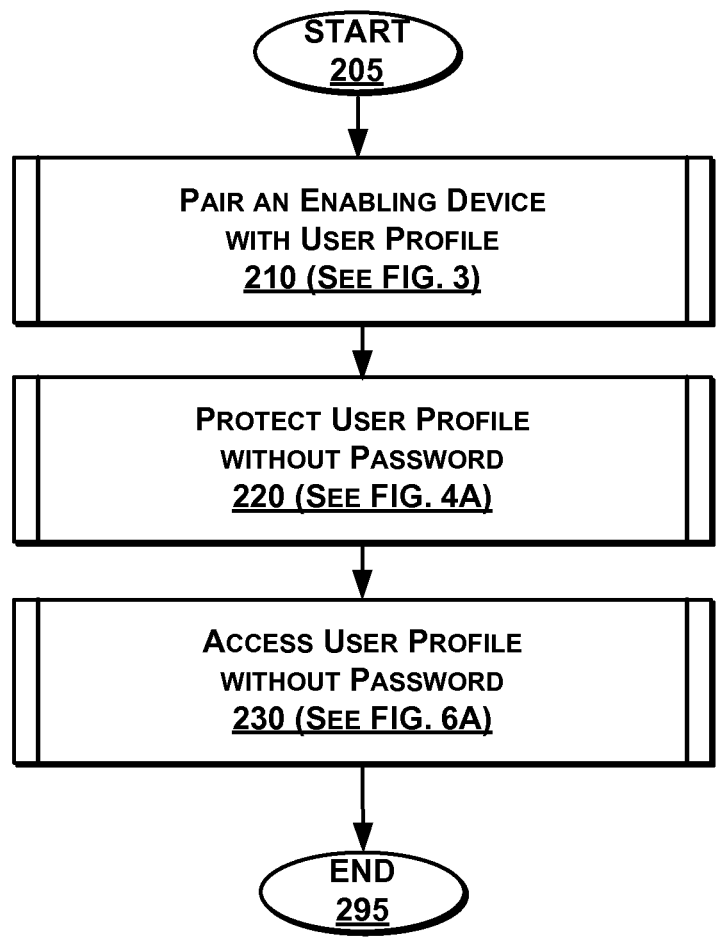
FIG. 2 is a high-level flow diagram illustrating a method for providing access control to user profiles without a password, according to one embodiment.

FIG. 2 is a high-level flow diagram illustrating a method 200 for providing access control to user profiles without a password, according to one embodiment. The method 200 can be implemented, in one embodiment, using the system 100 of FIG. 1A. Moreover, the method 200 can be implemented in software, hardware, or a combination of both. The method 200 can be automatically performed (once initialized) without human intervention.

At step 210, an enabling device is paired with a user profile. The user profile is created using information received from a user through a smart phone or a desktop computer. A user may need to log in and manage digital assets. For example, new files can be uploaded, and security settings can be changed for a particular digital asset. To configure a smart cellphone, for instance, for use as an enabling device, a QR-(quick response) Code or other indicia is generated and scanned by the cellphone. An example of pairing is described in FIG. 3.

At step 220, a user profile is protected without a password. Advantageously, vulnerabilities are eliminated because there is no compare step of the prior art password-based security. Rather than using a password, a portion of data is removed in order to handicap the digital asset. The data portion thereby serves as a key to restoring the user profile. In some embodiments, the key can be generated when handicapping the user profile with encryption. The digital asset can be individually secured, be part of a group of files secured by a single key, or file system references to the user profile can be secured. By comparison to the prior art, a compromised password exposes the unlimited potential of a digital asset in full. On the other hand, by use of the technique disclosed herein, the digital data portion is destroyed within a server after being sent to an enabling device. Therefore, there is no data and there is no key to be compromised using the techniques described herein. In some embodiments, more than one authentication is required to restore a user profile (e.g., modify a file or run an application). In other embodiments, a secret splitting technique is used to distribute derivatives of a key to a user profile. A more detailed discussion of how to implement step 220 is set forth below in association with FIG. 5A.

At step 230, a user profile is accessed without a password. An access to the user profile can include a login to view non-public data or take advantage of permissions specific to the user. To access user profiles, the data portion extracted in step 220 is reconstituted and used to enable user profiles for normal use. In one embodiment, user profiles are enabled exclusively in temporary storage (e.g., RAM) while remaining disabled in permanent storage. In other embodiments, more than one authentication is required to restore a digital asset (e.g., secret splitting). Each access can be logged. More details are set provided below in connection with FIG. 6A.

Figure 3:
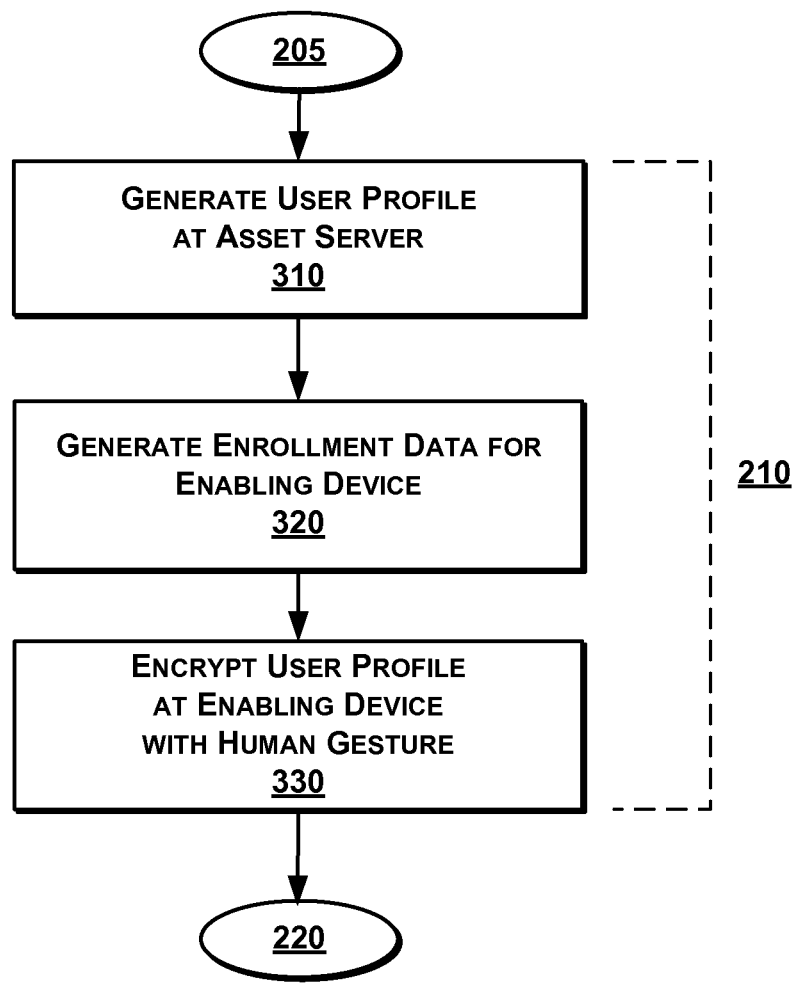
FIG. 3 is a flow diagram illustrating a method of FIG. 2 for pairing an enabling device with a user profile, according to one embodiment.

FIG. 3 is a flow diagram illustrating a method 210 of FIG. 2 for pairing an enabling device with a user profile, according to one embodiment. Given the disclosure herein, one of ordinary skill in the art will recognize that numerous alternatives are available for pairing, other than the following example.

At step 310, a user profile is generated at a server. A user name, e-mail, address, payment information, account numbers, desired services, preferences, friends list, contact list, multimedia files, data files, passwords, and their whereabouts, or other information can be associated with the user profile. The user profile links a particular individual to the private data stored on a server.

At step 320, enrollment data is generated for an enabling device 130 used to access a user profile. In one embodiment, a QR-code can be generated for display on a computer screen. The enabling device can scan the QR-code to receive encoded information needed for enrollment of the enabling device. In other embodiments, enrollment data can be sent directly to the enabling device using a data network. As a result, a secure communication (e.g. SSL, or secure socket layer) is created between the secure web site server and the enabling device.

At step 330, a client application is installed at the enabling device. The client application handles communications between the secure web site server and an asset owner. When a digital data portion of a key is received, the client application requests a human gesture from the asset owner for disablement (e.g. encryption). Likewise, when an access notification is received, the client application requests a human gesture from the owner for enablement (e.g. decryption). Of course some implementations can circumvent the need for any preconfiguring by leveraging existing local applications (e.g., can be integrated to a Web browser, an operating system, a semiconductor chip set), streaming applications and cloud-based applications.

Figure 4A:
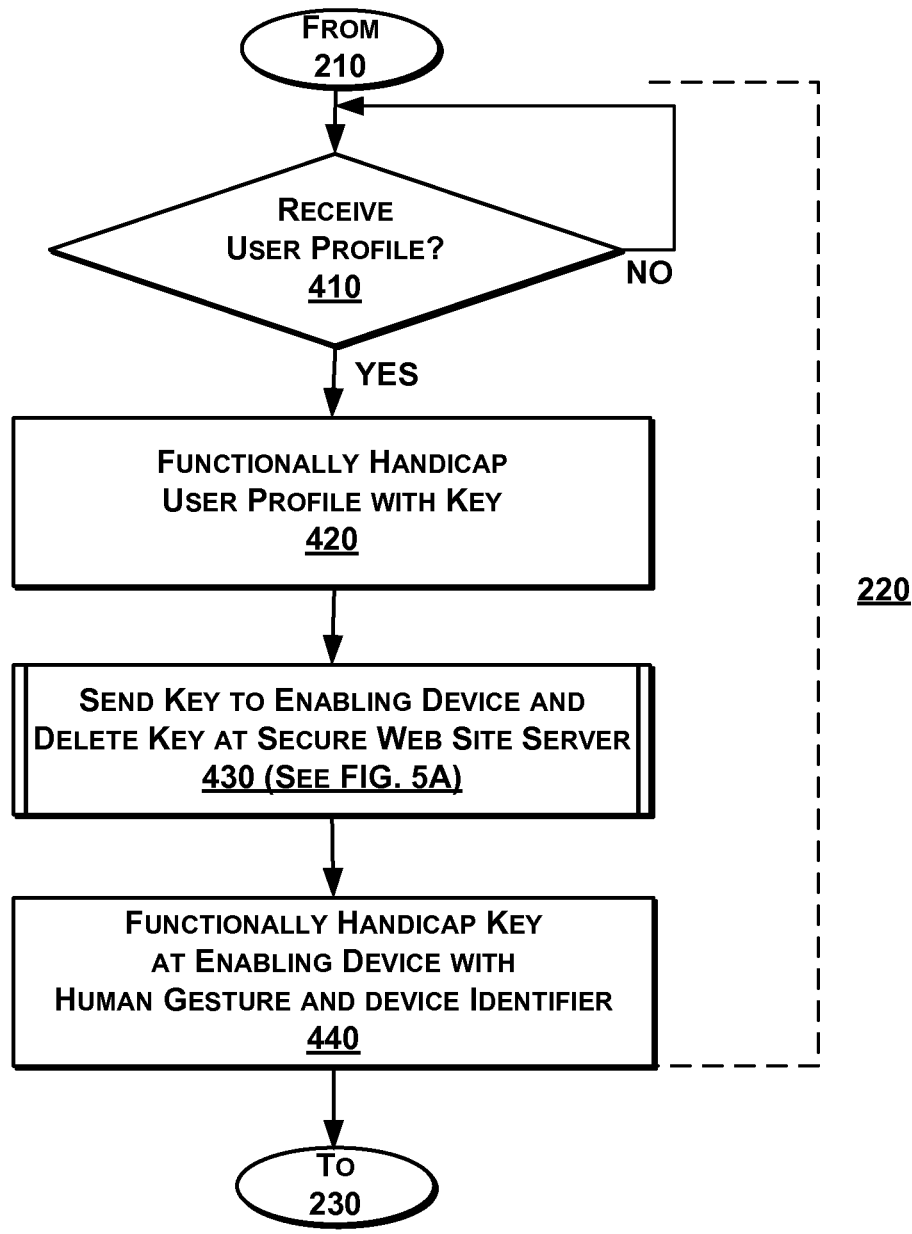
FIGS. 4A-B illustrates a step for protecting a digital asset without a password of FIG. 2, according to some embodiments.
Figure 4B:
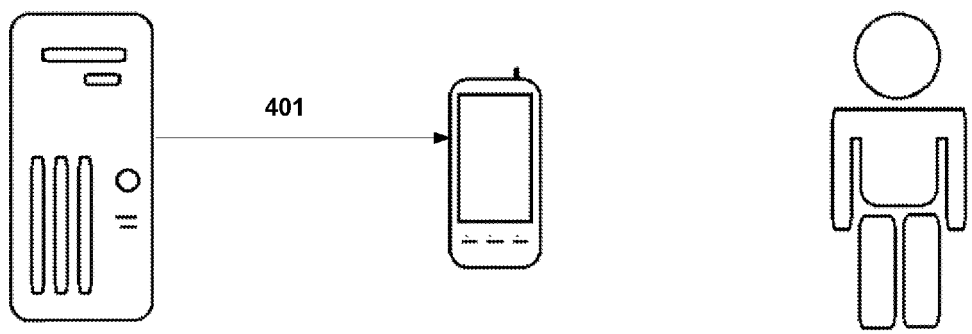
Figure 4B:
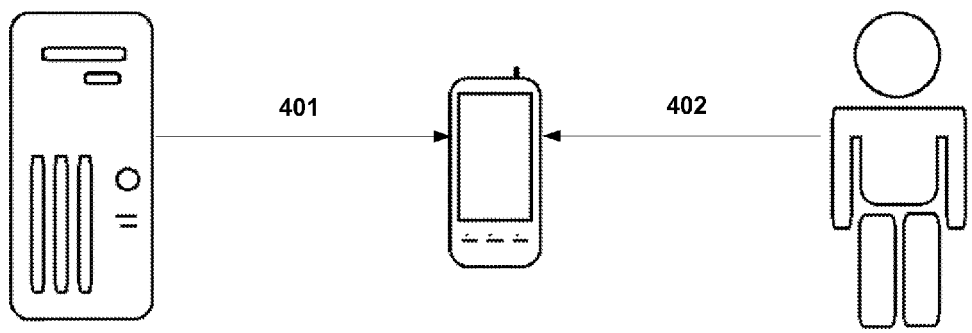

FIG. 4A is a flow diagram and FIG. 4B is a schematic diagram illustrating step 220 of FIG. 2 for protecting a user profile without a password, according to one embodiment. At step 410, the process awaits receipt of a user profile (e.g., as newly configured, updated, or after log-off by a user). Once a user profile is received for storage in an asset database, it needs to be disabled.

At step 420, a portion of digital data associated with the user profile is removed to handicap the user profile. The portion can be part of the user profile itself, or peripheral data. In one embodiment, the digital asset is encrypted with a symmetric or asymmetric key, and the key or a portion of the key is removed. In another embodiment, bits of data are removed from the digital asset itself. For example, a sensitive part of a document can be targeted for removal so that even if the document is somehow restored, the sensitive parts of the document are not present. The removal can also be randomly-located. Fake bits can be substituted for removed bits to hide location. The number of bits removed should exceed correction capabilities by CRC (cyclic redundancy check) and the like, and the number of bits can be based on a type of digital asset or security level. In still another example, configuration data needed to view or execute a digital asset are removed (e.g., DLL, or dynamic linked library, files). For example, a Word or .DOC file includes a metadata portion that is needed to decode the data file. In some implementations, data assets on an secure web site server appear as a list of files with unknown file types by removing file formatting data. Consequentially, a hacker looking for a certain type of file will be set back even further. In yet another embodiment, hardware operation is handicapped by substantially altering its firmware. The hardware, which can be an automobile, a garage door opener, a computer terminal, or any other protected physical device, is rendered inoperable until its firmware is reinstated.

At step 430 (and interaction 401), the key (or asset data portion) is sent to an enabling device and removed from a server. In some embodiments, the digital data portion can be sent to multiple enabling devices, as discussed below with respect to FIGS. 5A-B. A user profile can be checked to find an enabling device of the asset owner. Once the digital data portion is confirmed as being received by the enabling device, the digital data portion is securely erased from volatile or permanent memory on the server. The data can be merely disassociated with any file system entry, or securely removed to prevent recovery. By removing the digital data portion, there is no local key for decrypting, or otherwise reconstituting the user profile in case the secure web site server is compromised. Further, there is no link to the enabling device, leaving no trace of how to find the enabling data portion.

In some embodiments the key (or asset data portion) is only partially removed from a server. In more detail, a secret splitting algorithm can be utilized to generate a derivative key stored on the server away from the user profile. As a result, any access of the digital asset can be logged by the server, even if a copy is stored locally on a remote storage device. The secret splitting algorithm generates unique derivative keys for the enabling device or devices. One way to generate derivative keys is to randomly select data points along a polynomial graph. Each unique data point is potentially a unique derivative key.

At step 440 (and interaction 402), the key (or asset data portion) is functionally disabled with a human gesture and device identifier. First, the key can be encrypted or otherwise handicapped by the enabling device. In turn, the cryptographic key or extracted bits can be removed from the enabling device for further protection by applying a secret splitting algorithm. The splitting algorithm produces derivative keys of the received key (which itself can be a derivative key of the cryptographic key used to disable the digital asset at the secure web site server). Specifically, a first derivative key is generated from a unique identifier of the enabling device, such as a serial number, a NIC number, a static IP address, a MAC address or the like. The unique identifier is plugged into the secret splitting algorithm and the resulting first derivative key, which is now tied to the enabling device and cannot be reconstituted from another device, is stored at the enabling device. Further, a second derivative key is generated from human gesture data received. Information used to derive the key (or user profile data portion) can then be discarded from the enabling device.

Besides a human gesture, any other type of human-input data can be used, such as a voice pattern, a retina pattern, fingerprint, or facial scan. Data from a human gesture is securely discarded from the enabling device as soon as a key (or asset data portion) is disabled or reconstituted. In some implementations, data from a human gesture can be stored and automatically supplied in lieu of availability of the user profile owner. The human gesture can be stored separately from an enabling device and automatically provided, for example, in low security environments such as access to view movies. If the user profile owner loses confidence in the automatic process, it can be easily terminated or updated with a new human gesture.

Figure 5A:
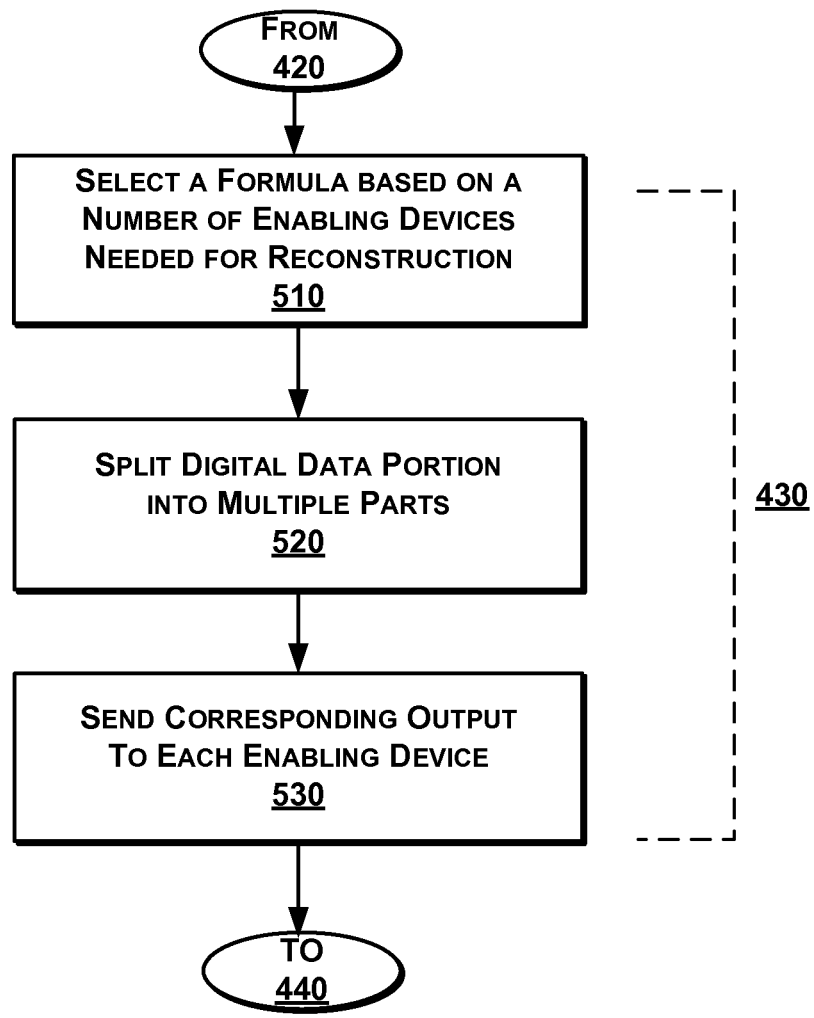
FIGS. 5A-B illustrate a step for sending sub-portions of a digital data portion to multiple enabling devices using a secret-splitting algorithm of FIG. 4A, according to some embodiments.
Figure 5B:
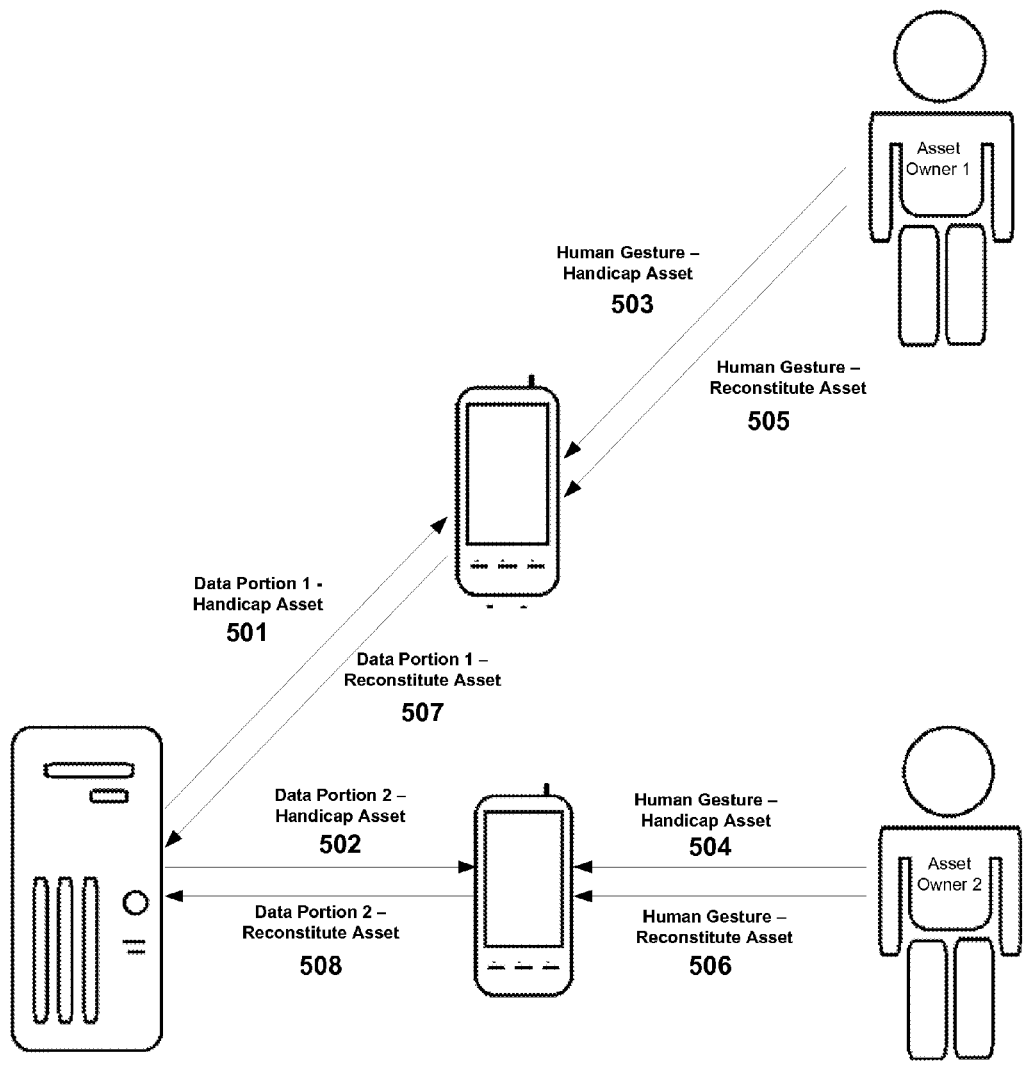

FIG. 5A is a flow diagram and FIG. 5B is a schematic diagram illustrating a method 430 of FIG. 3 for sending sub-portions (or derivatives) of a digital data portion to multiple enabling devices using a secret splitting algorithm, according to some embodiments. For example, a Shamir polynomial decomposition and re-composition algorithm can be employed to divide a secret into unique parts and give each enabling device a unique part of the secret. In a threshold scheme of secret sharing, any threshold number of enabling devices can trigger re-composition, rather than needing all enabling devices. For example, any two management employees can be required to access certain financial data.

In some embodiments, the user profile data portion is distributed among the secure web site server and multiple enabling devices. In a horizontal architecture of multiple enabling devices, a digital asset portion is split among the enabling devices from a server. Each of these enabling devices may also be needed for reconstitution. But in some embodiments, only a threshold number of enabling devices is needed for reconstitution. The threshold number is less than the total number of enabling devices. For instance, any three of ten enabling devices can be required for reconstitution. In a vertical architecture of multiple enabling devices, a user profile portion is sent to a first enabling device, where it is split and the split portion sent to a second enabling device. The second enabling device can again split received data, and so on.

At step 510, a formula is selected based on a number of enabling devices that are needed for reconstruction. The coefficients of the polynomial are set based on input received. For example, a jointly-owned project may require each of the enabling devices for reconstructions, while an employee-only project may require at least one of many employees. The same formula is used for decomposition.

At step 520, a digital data portion is split into multiple parts. The parts can have some overlap, be mutually exclusive, or some parts can be duplicates. Most importantly, all of the information needed to reconstitute a user profile is not available on a server. Consequentially, digital assets stored on a compromised server are still protected. As discussed, the splitting can be performed at an enabling device and split parts passed to other enabling devices in a hierarchy.

A secret splitting algorithm can be utilized to generate multiple keys. In more detail, a key is used as a constant or a coefficient in a polynomial equation. Any number of keys can be generated as data points on the polynomial graph. The specific form of the equation depends on how many unique keys are being distributed. For a line (e.g., ax+y), only two data points are needed as input to solve for reconstitution. For a parabola (e.g., $ax^2+bx+y$, etc.), at least three data points are needed as input to solve for reconstitution. An example polynomial can be $S-81x+64x^2$, where S is a constant representing a cryptographic key or data portion used for handicapping the user profile. To generate a point on the graph to be used as a derivative key stored at a server or sent to an enabling device, a random value within a valid range of x is input to the polynomial and a y value is output. The resulting (x,y) data point is the derivative key, in some embodiments. To reconstitute the discarded polynomial, a requisite number of (x,y) data points are provided (e.g., from the server and at least one enabling device), as described herein.

In one embodiment, a Shamir secret splitting algorithm is implemented. To derive a polynomial, Shamir uses the well-known Lagrange polynomial interpolation formula. Alternative secret splitting algorithms can also be implemented, such as the Mignotte scheme (using Chinese remainder Theorem) or the Blakely scheme.

At step 530 (interactions 501, 502), one of the parts is sent to each of the enabling devices. Rather than sending the parts to a single enabling device, the parts are distributed to more than one end point. Each enabling device encrypts the parts with a human gesture (interactions 503,504). Additionally, one of the parts can be stored on a server, apart from the digital asset. All other data is destroyed at the server for security, in some embodiments, including the polynomial used to generate keys, and keys sent to an enabling device. The key is effectively hidden at the enabling device, away from any hacker, by getting rid of the key altogether. Even if the enabling device is compromised, part of the key has been hidden by a secret splitting algorithm and the human gesture, as described herein.

A horizontal co-ownership is illustrated in FIG. 5B. Two types of horizontal co-ownership include equal co-ownership and distributed co-ownership. In equal co-ownership, a separate polynomial is used to generate keys for each co-owner. There is no dependency as each co-owner can access the user profile without an accord. Equal horizontal co-owners of a digital asset are independent of one another by a secret splitting algorithm that utilizes a different polynomial for each co-owner and all polynomials share the same constant (i.e., the key). Meanwhile, in a distributed co-ownership, a single polynomial of a higher degree is used to generate keys for each co-owner. The dependency in this case to access the digital asset requires keys from each or a subset of co-owners.

The return path is also illustrated in FIG. 5B, in which upon notification of an access request, human gestures are received (interactions 505, 506) in order to release the parts back to the server (interactions 507, 508).

Figure 6A:
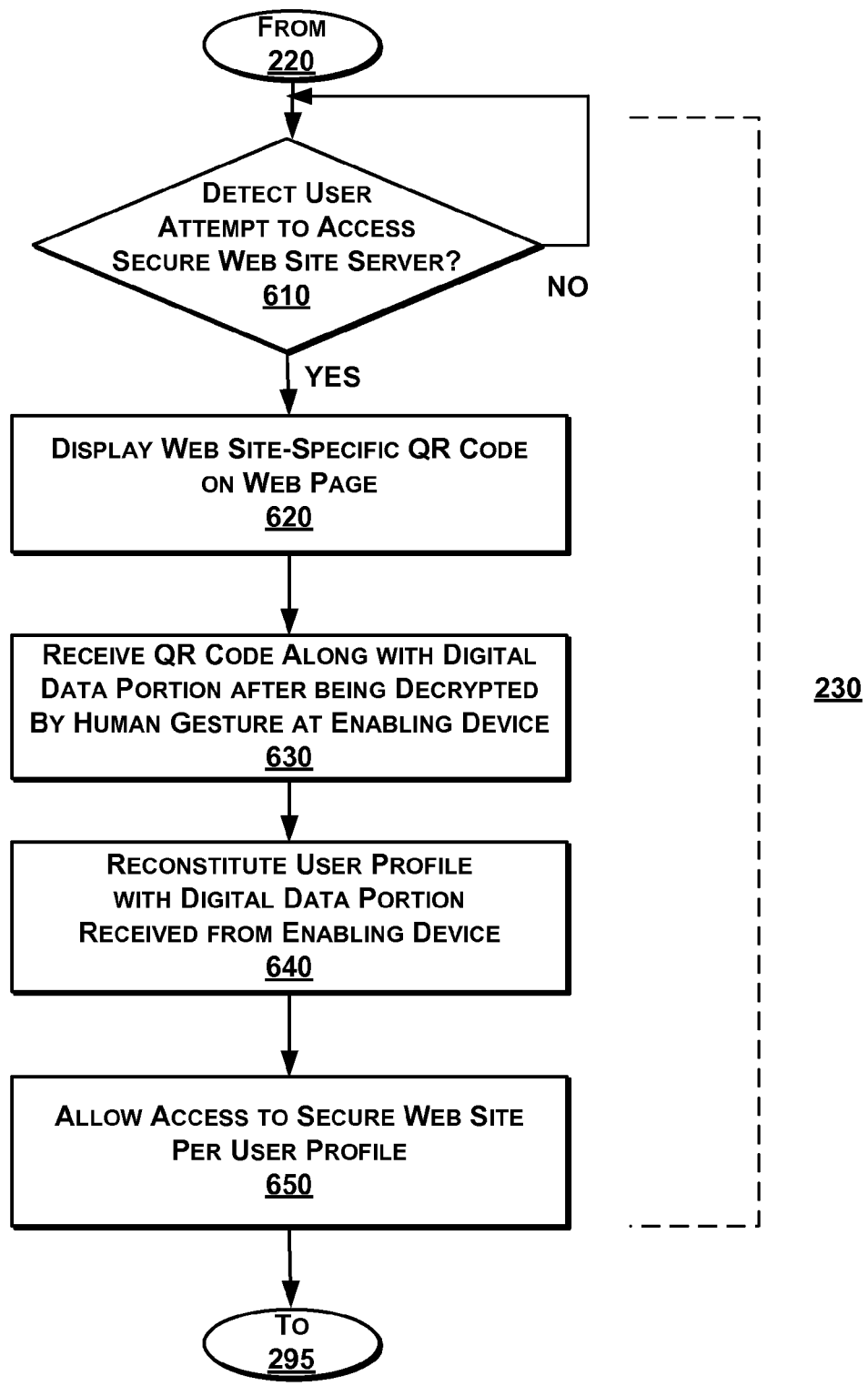
FIGS. 6A-B illustrates a step for accessing a digital asset without a password of FIG. 2, according to some embodiments.
Figure 6B:
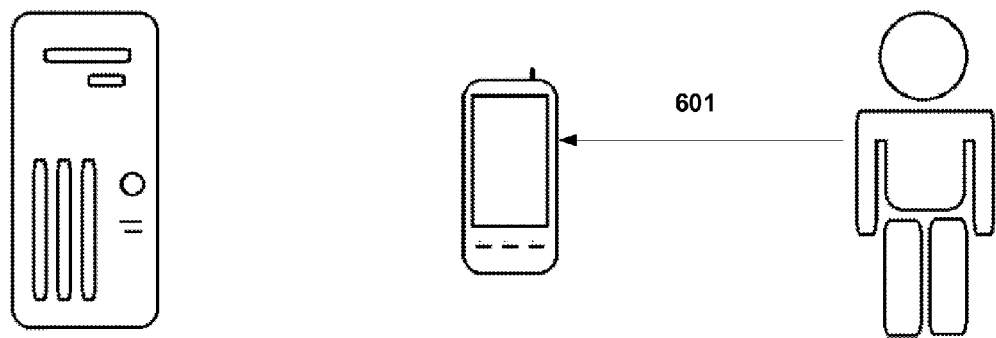
Figure 6B:
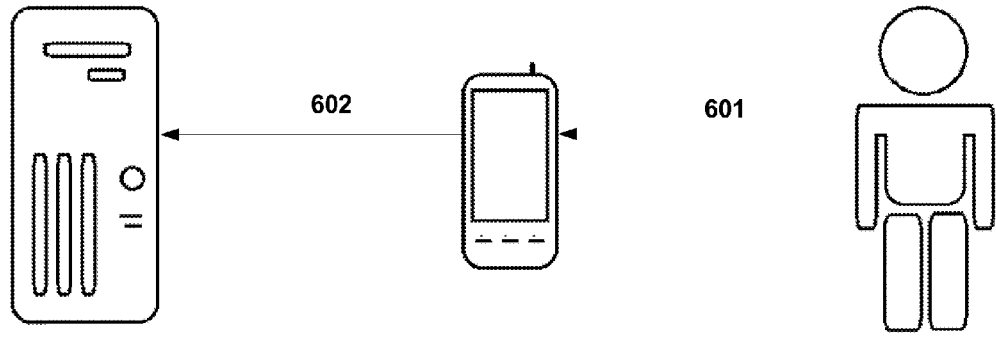

FIG. 6A is a flow diagram and FIG. 6B is a schematic diagram illustrating step 230 of FIG. 2 for accessing a user profile without a password, according to some embodiments. Specifically, FIG. 6A is a flow diagram illustrating step 230 of FIG. 2 for accessing a user profile without a password. At step 610, the process awaits receipt of a request to access a user profile. An asset host can receive a request from a user profile owner, or a non-owner, and from a human or an automated computer process.

At step 620, a web site-specific QR-code is displayed on a Web page. The QR-code identifies the web site being accessed. A URL or other identifier, including a single use identifier, can be encoded into the QR-code. In one embodiment, the QR-code is unique to a specific login session, or unique to a particular user or enabling device.

At step 630, the scanned QR-code is received along with a data portion (interaction 602) after being reconstituted by a human gesture (interaction 601). The gesture can be a two-dimensional or three-dimensional movement of the hand or other body parts. In some embodiments, other forms of input can be implemented, such as a retina scan or fingerprint. Data from the human gesture forms a key that is used to decrypt the digital data portion for transmission to web site server.

At step 640, a user profile is reconstituted using the digital data portion received from the enabling device. In one embodiment the digital data portion received from the enabling device is used as a key to decrypt the user profile for use as requested.

Optionally, access to the user profile is logged, in one embodiment. Because all the steps to access a digital asset are e-signed by the participants (systems or humans), the log may be admissible to court as an identification and authentication of the person accessing the user profile. Additionally, license restrictions can be enforced by recording quantities and durations of access.

Exemplary Computing Device (FIG. 7)

FIG. 7 is a block diagram illustrating an exemplary computing device 700 for use in the system 100 of FIG. 1, according to one embodiment. The computing device 600 is an exemplary device that is implementable for each of the components of the system 100, including the user terminal 110, the secure web site server 120, and the enabling device 120. Additionally, the system 100 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O (Input/Output) port 740. Each of the components is coupled for electronic communication via a bus 799. Communication can be digital and/or analog, and use any suitable protocol.

The memory 710 further comprises a digital asset protection module and an operating system 722. The digital asset protection module 712 can include the modules of the secure web site server 110 and the enabling device 120, as represented generally by a digital asset protection module 712. Other modules stored in memory can include a web browser application, a web-browser-based application, a mobile application, a streamed application, a locally-installed application, and the like.

The operating system 722 can be one of the Microsoft Windows® family of operating systems (e.g., Windows 2000, Windows XP, Windows XP x64 Edition, Windows Vista, Windows 7, Windows 8, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 720 can be single core, multiple core, or include more than one processing elements. The processor 620 can be disposed on silicon or any other suitable material. The processor 720 can receive and execute instructions and data stored in the memory 710 or the storage drive 730.

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output.

Many of the functionalities described herein can be implemented with computer software, computer hardware, computer firmware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an Intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Bluetooth, LTE, Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for providing access control to user profiles without a password, comprising:
    detecting an attempt to access a user profile, wherein the user profile has been functionally handicapped to prevent normal use, whether the use is authorized or not, wherein the user profile has been functionally handicapped by an enabling device that encrypted the digital data portion with at least data related to unique human input;
    in response to the detection, displaying information that uniquely identifies the user profile;
    receiving a digital data portion from an enabling device that has read the information that uniquely identifies the user profile and decrypted the digital data portion with data from a unique human input received from the user attempting to access the user profile; and
    reconstituting the user profile using the digital data portion to functionally enable the user profile for normal use.

2. The method of claim 1, further comprising:
    functionally handicapping the user profile by removing the digital data portion associated with the user profile; and
    discarding the digital data portion from a server storing user profiles.

3. The method of claim 1, wherein substantially functionally handicapping comprises at least one of:
    substantially functionally handicapping the user profile with a cryptographic key to prevent normal use, and
    substantially functionally handicapping the user profile by removing a portion of bits from the user profile itself to prevent normal use of the user profile.

4. The method of claim 1, wherein unique human input comprises a two-dimensional or a three-dimensional human gesture.

5. The method of claim 1, wherein unique human input comprises at least one of: an alphanumeric string, a retina scan, a facial scan, a fingerprint scan, and a voice sample.

6. The method of claim 1, wherein the enabling device substantially functionally handicapping the digital data portion comprises:
the enabling device encrypting the digital data portion with a unique identifier associated with the enabling device.

7. The method of claim 1, further comprising:
receiving a request to access the user profile; and
in response, sending a notification to the enabling device to send the digital data portion for reconstitution.

8. The method of claim 1, further comprising:
logging each access to the user profile, regardless of whether the user profile is stored at a secure web site server.

9. The method of claim 1, wherein reconstituting the user profile comprises:
reconstituting the user profile in a volatile memory while the user profile remains functionally handicapped in a non-volatile memory.

10. The method of claim 1, wherein the enabling device comprises a wireless mobile device.

11. The method of claim 1, further comprising:
allowing access to the user profile in a volatile memory responsive to the reconstitution for normal use;
detecting an indication of a successful logon or logoff by the user; and
discarding the user profile from the volatile memory.

12. The method of claim 1, wherein the machine-readable code comprises at least one of: a QR (Quick Response)-code, a UPC (Universal Product Code) label, a barcode, a serial number.

13. A computer-implemented method for providing access control to user profiles without a password, comprising:
detecting an attempt to access a user profile, wherein the user profile has been functionally handicapped to prevent normal use, whether the use is authorized or not, wherein the user profile has been functionally handicapped by:
generating at least two derivative sub-portions of the digital data portion, the two derivative sub-portion corresponding to two keys; and
sending one of the at least two keys to an enabling device;
in response to the detection, displaying machine-readable information that is unique;
receiving a digital data portion from the enabling device that has read the machine-readable information along with an indication of the machine-readable information, the digital data portion being specific to the user attempting to access the user profile; and
reconstituting the user profile using the digital data portion to functionally enable the user profile for normal use.

14. The method of claim 13, wherein generating the at least two derivative sub-potions corresponding to two keys comprises:
using a polynomial of a Shamir-type secret splitting algorithm to derive at least two data points which correspond to at least two keys.

15. The method of claim 13, further comprising:
storing one of the at least two keys on a server apart from the user profile.

16. A computer-implemented method for protecting a digital asset, comprising:
receiving at least a portion of digital data associated with the digital asset that has been substantially functionally handicapped by removal of the digital data portion, from an secure web site server;
receiving a unique human input from an owner of the digital asset;
substantially functionally handicapping the digital data portion with data from the unique human input;
responsive to receiving a notification for a request for access to the digital asset, requesting the unique human input from the owner of the digital asset;
reconstituting the digital data portion with the unique human input; and
sending the digital data portion to the secure web site server to reconstitute the digital asset for normal use.

17. A non-transitory computer-readable medium storing executable code that, when executed by a processor, performs a method in a secure web site server for providing access control to user profiles without a password, the method comprising:
detecting an attempt to access a user profile, wherein the user profile has been functionally handicapped to prevent normal use, whether the use is authorized or not, wherein the user profile has been functionally handicapped by an enabling device that encrypted the digital data portion with at least data related to unique human input;
in response to the detection, displaying information that uniquely identifies the user profile;
receiving a digital data portion from an enabling device that has read the information that uniquely identifies the user profile and decrypted the digital data portion with data from a unique human input received from the user attempting to access the user profile; and
reconstituting the user profile using the digital data portion to functionally enable the user profile for normal use.

18. A system to protect a digital asset, comprising:
a processor; and
a memory, storing:
a login SODA agent detecting an attempt to access a user profile, wherein the user profile has been functionally handicapped to prevent normal use, whether the use is authorized or not, wherein the user profile has been functionally handicapped by an enabling device that encrypted the digital data portion with at least data related to unique human input, in response to the detection, displaying information that uniquely identifies the user profile, and receiving a digital data portion from an enabling device that has read the information that uniquely identifies the user profile and decrypted the digital data portion with data from a unique human input received from the user attempting to access the user profile; and
a SODA engine reconstituting the user profile using the digital data portion to functionally enable the user profile for normal use.

* * * * *